April 12, 1949.       R. V. CRADDOCK ET AL       2,466,687
INTEGRATING AND REMOTE READING COMPASS SYSTEM
Filed Aug. 13, 1945                    2 Sheets-Sheet 1
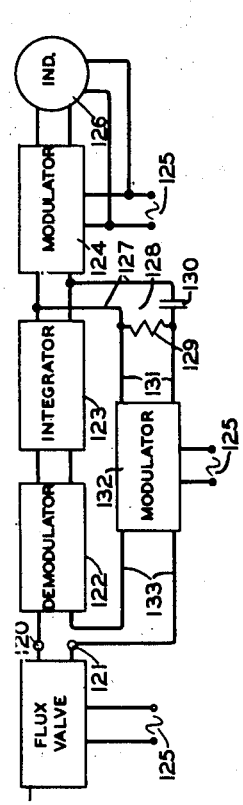
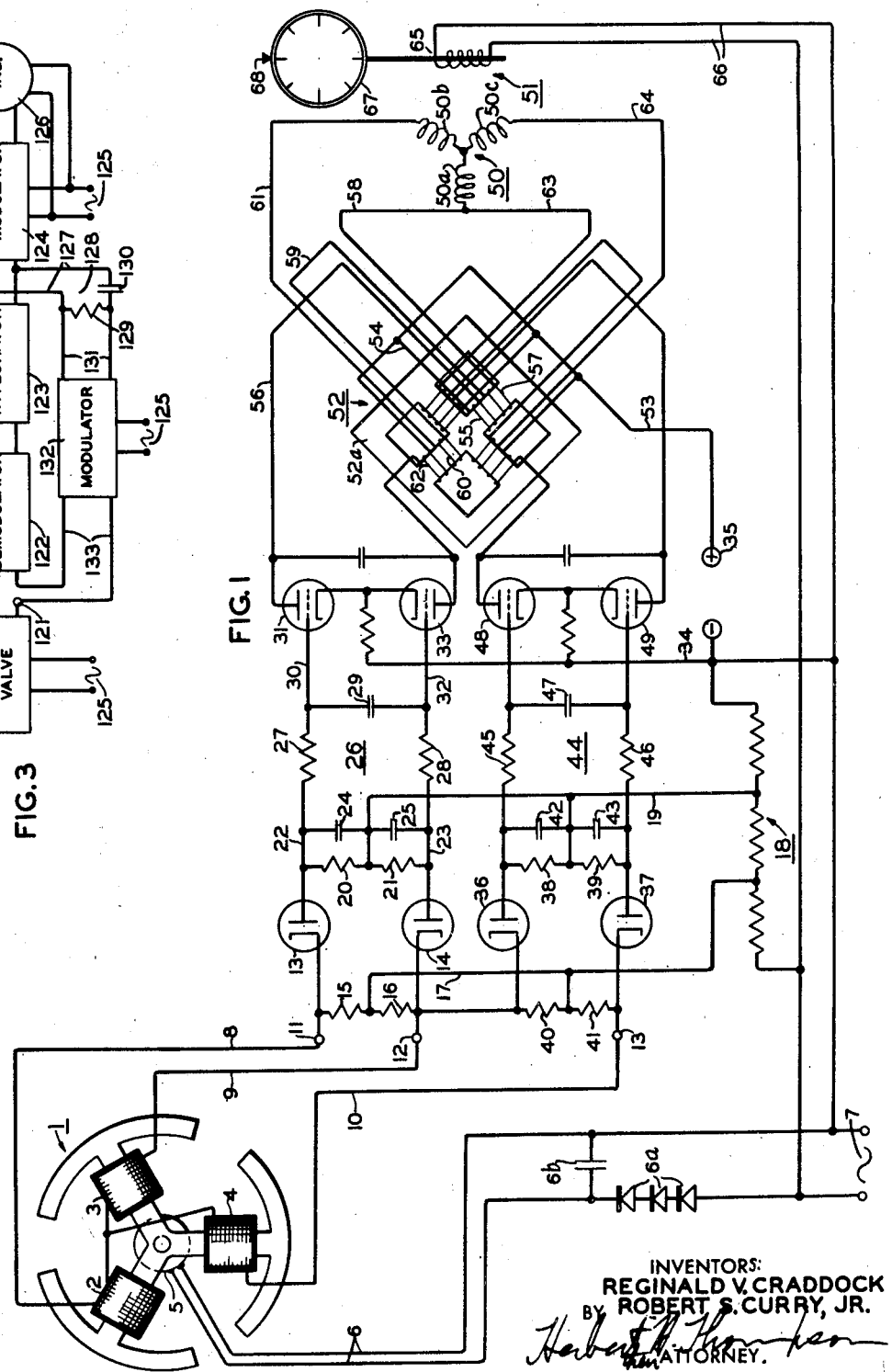
INVENTORS:
REGINALD V. CRADDOCK
ROBERT S. CURRY, JR.
BY
ATTORNEY.

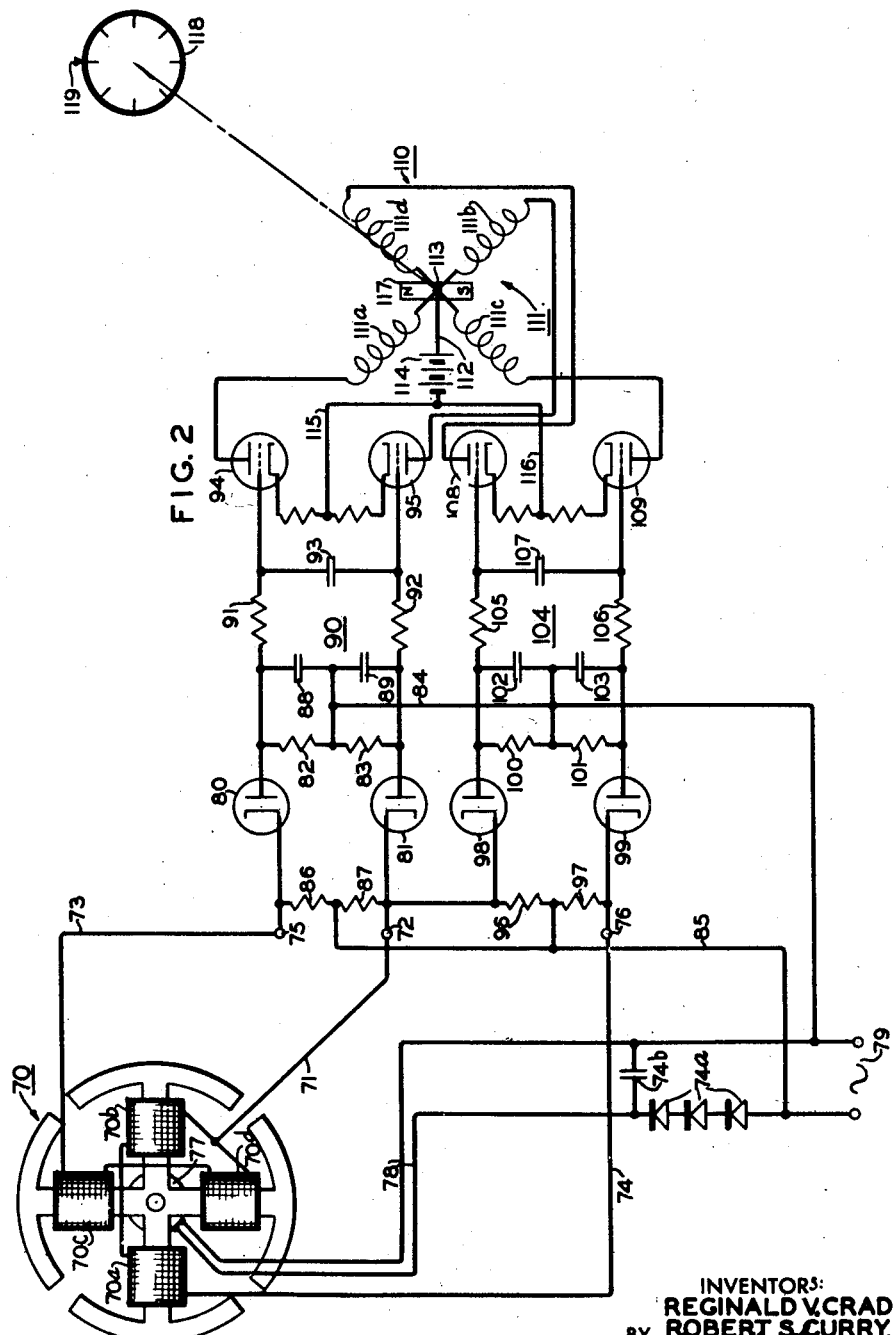

Patented Apr. 12, 1949                                                             2,466,687

UNITED STATES PATENT OFFICE 2,466,687

INTEGRATING AND REMOTE READING COMPASS SYSTEM

Reginald V. Craddock, Williston Park, and Robert S. Curry, Jr., Baldwin, N. Y., assignors to The Sperry Corporation, a corporation of Delaware Application August 13, 1945, Serial No. 610,576

12 Claims. (Cl. 318—23.5)

Our invention relates generally to data transmission systems and to compass systems wherein indications are provided in a position remote from the transmitter or the earth's field-sensitive element. Our invention particularly relates to a remote reading compass system embodying, for example, a flux valve as the field-sensitive element and in which an improved operation of the repeater, controlled thereby, results.

As is well known in this art, flux valves constitute magnetic field-sensitive elements which have one or a plurality of core legs of high permeability magnetic material and supply signal voltage outputs which, in amplitude, are proportional to the component or those components of the external magnetic field or the earth's field which parallel the longitudinal axes of the core legs. The output of the flux valve, therefore, is particularly adapted for use in controlling a remote repeater which will provide bearings or azimuth indications. Flux valves are ordinarily excited or rendered field-sensitive by means of an exciting coil energized with alternating or periodically varying current.

The outputs or signal voltages derived from the flux valve are of a frequency substantially twice that of the current source employed in exciting the flux valve, and it is extremely difficult in practice to keep extraneous, spurious or other undesired voltage components out of the flux valve output. When such components are present, of course, accurate control over movements of the repeater is lost, the wave form of the output is poor and the compass indications may be seriously in error. The flux valves are designed to improve the wave form of the signal voltage output as much as possible and to screen out the harmful voltage components, above noted. However, in spite of the precautions taken in the designs of the flux valves, the wave form of the signal voltage outputs of the flux valves are not too good or as good as is desired.

Obviously, too, the outputs of the flux valves may often comprise signal voltage components which result from transitory causes such as movements or oscillations of the flux valve out of a horizontal plane. Spurious error voltages of this character produce corresponding reactions of the repeater motor and under conditions of oscillation of the craft or of the flux valves carried thereupon, the repeaters will likewise oscillate and provide "jittery" indications.

It is, therefore, a primary object of the present invention to provide a remote reading compass system in which the controlled voltage output of the amplifier connecting the flux valve with the repeater is substantially free from the wave distortions present in the flux valve output.

It is another primary object of the present invention to provide a remote reading compass system in which the signal voltage outputs of the flux valve are integrated whereby to improve and provide a smoother and more accurate operation of the repeater motor embodied in said system.

Another object resides in providing a system of the foregoing character in which the output of the flux valve is demodulated to provide a corresponding unidirectional signal voltage and in which the unidirectional voltage is integrated and then modulated with an alternating voltage substantially of the frequency of that employed in exciting the valve. In a system of this character, the wave form of the control voltage output of the amplifier is materially improved as compared to the wave form of the output of the flux valve and additionally is of the same frequency as the source employed in exciting the flux valve, thereby eliminating the necessity of employing frequency doublers or the like, while the system will operate without any ambiguity in the readings afforded thereby.

Still another object resides in providing a system in which the output of the flux valve is demodulated or rectified to provide a corresponding unidirectional signal voltage which is then integrated to smooth out the signal voltages and provide signal voltages of average amplitudes which may be amplified and are then supplied to the field windings of a D. C.-type repeater motor. It will be seen that in a system of this character, spurious error voltage components may be averaged out so that the output voltages of the amplifier which correspond to the signal voltage outputs of the flux valve are more accurate in magnitude values than they otherwise would be.

Still other objects of our invention reside in the provision of compass systems including means for improving the wave form of the voltages applied to the repeater motors in the systems, and also to such compass systems in which spurious error and unwanted voltage components of fairly short duration are, in the main, averaged out or integrated.

It is to be noted that the systems of the present invention, in addition to effecting a smoothing action on the control signal voltages, also function to minimize the coercive torques produced where, for example, transmitters of the type of the conventional Selsyn generators are used instead of flux valves. When less power (current) is drawn from the transmitter, a corresponding increase results in accuracy of the repeater unit because the internal impedance will have less effect.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

With the foregoing and still other objects in view, our invention includes the novel elements and the combinations and arrangements thereof described below and illustrated in the accompanying drawings, in which—

Fig. 1 is a wiring diagram of a preferred form of remote reading compass system;

Fig. 2 is a wiring diagram of a modification thereof; and

Fig. 3 schematically illustrates a still further modification.

In the embodiments of our invention herein illustrated, we have shown systems which are characterized by the fact that the control voltages supplied to the repeater motor are substantially free from distortions or sudden changes in amplitude or magnitude because the spurious error voltages are integrated. In the system illustrated in Fig. 1, it is to be noted that it is characterized by the fact that the wave form of the alternating control voltages supplied to the repeater motor is independent of and free from distortions or irregularities including extraneous frequencies appearing in the output of the flux valve. In both embodiments, however, improved and more accurate operations of the repeater motor are produced. Furthermore, in both systems, the integration components, so provided, assures smoother and more positive operation of the repeater motor with less oscillations or hunting.

The system illustrated in Fig. 1 includes a multi-legged flux valve indicated generally at 1 which may comprise the three relatively angularly arranged core legs, herein shown, upon which are mounted the pickup windings 2, 3 and 4. The flux valve is rendered field-sensitive or is excited by means of an exciting coil indicated generally at 5 which is disposed centrally of the core structure and is connected through leads 6 with a source 7 of alternating or periodically varying current. In the embodiment illustrated, the three pickup windings 2, 3 and 4, which supply the signal voltage outputs, are connected together in multicircuit fashion (resembling a Y, 3-phase connection) and through leads 8, 9 and 10 with the input terminals 11, 12 and 13 of a two-channel amplifier in which the input terminal 12 is common to both channels. Separate single channel amplifiers for each of the three signal voltage outputs could, of course, be used.

We will first describe one channel of the amplifier, that including the input terminals 11 and 12, and it will be understood, as hereinafter described, that the second channel is substantially identical therewith. The input terminals 11 and 12 are connected respectively with the cathodes of diode tubes 13 and 14, the cathodes of which are connected in balanced relation through resistors 15 and 16 and through lead 17 to a voltage divider indicated generally at 18. The voltage divider 18 is preferably connected across the alternating current source 7 and is also connected with the plates of tubes 13 and 14 through the lead 19 and the plate resistors 20 and 21. With this arrangement, tubes 13 and 14 function as a phase-sensitive demodulator or rectifier to supply a D. C. or unidirectional voltage across the output leads 22 and 23 of the above-described stage of the amplifier.

In order to provide phase-sensitive rectification of the signal voltage outputs of the flux valve where, as in the embodiment illustrated, diodes are employed and energized from the source of alternating current 7, we prefer to connect in one lead 6 rectifying means such as a series of oxide rectifiers 6a which function to provide half-wave excitation of the flux valve 1. Additionally, a condenser 6b is preferably connected across the leads 6 for the purpose of sustaining the unidirectional pulse derived from the rectifiers, and this condenser may also be employed for phasing purposes.

The unidirectional voltages which will appear across the resistors 20, 21 correspond in magnitude to the resultant of the output voltages appearing across the pickup coils 2 and 3 of the flux valve and the polarity thereof will depend upon the phase sense of the resultant of said output voltages of the valve. Smoothing or filtering condensers 24 and 25, which are connected across the leads 22 and 23, serve to smooth out the resultant unidirectional voltage.

The unidirectional voltage output of the rectifier stage of our amplifier, above described, is then impressed across an integrating network indicated generally at 26 and comprising resistors 27 and 28 and condenser 29 connected therebetween. The point intermediate resistor 27 and condenser 29 is connected through lead 30 to the control electrode or grid of one electron tube 31 comprised in a modulating stage of our amplifier while a point intermediate resistor 28 and condenser 29 is connected through lead 32 to the control electrode or grid of a second electron tube 33 comprised in said modulating stage. The smoothed D. C. or unidirectional voltage output of the diodes 13 and 14 is applied across the resistance-capacitance integrating network 26 so that the output of this network, that is the voltage between the leads 30 and 32, will be a voltage having the polarity of the output of the rectifier stage, but of a magnitude proportional to the average of the magnitude of the voltage outputs of the rectifier tubes. In this way, fluctuations in the signal voltage outputs of the flux valve which are of relatively short duration not exceeding the time constant of the integrating circuit will not materially affect the repeater motor or cause it to oscillate or hunt. The improved operation of the repeater is attributable to the integrating function of the above-described network.

The output voltage of the integrating network 26, as above indicated, is supplied differentially to the grids or control electrodes of the modulating tubes 31 and 33. These control signal voltages which are applied to the grids from the integrating network, are of a D. C. character while an alternating bias voltage is applied between the cathode and grids of these tubes by means of lead 34 which is connected with one side of the A. C.

source 7 and with the cathodes of said modulating tubes, as illustrated, and through lead 19, above described, which is connected with the grids of these tubes. The plates of these tubes are connected to a suitable source of plate potential indicated generally at 35 and in a manner hereinafter described, so that the output of tubes 31 and 33 will comprise an alternating voltage which is of the frequency of the source 7 but, in amplitude, is proportional to the magnitude of the integrated D. C. voltages or the integration voltage components applied to the grids thereof. Hence, the outputs of the modulator stage comprising tubes 31 and 33 of the amplifier will be a control signal voltage which is applied as hereinafter described to the stator windings of a repeater motor. These control voltages are of the same frequency as the source 7 and vary in amplitude in correspondence with average variations in amplitude of the signal voltages derived from the flux valve.

The second channel of the amplifier circuit shown in Fig. 1 is in all material respects similar to the channel above discussed. In other words, input terminals 12 and 13, across which the signal voltage outputs from flux valve coils 3 and 4 are impressed, are connected with the cathodes of diodes 36 and 37. These rectifying tubes are similarly connected with the voltage divider 18 through leads 17 and 19, lead 19 being connected with the plates of these tubes through plate resistors 38 and 39 and lead 17 being connected with the cathode resistors 40 and 41. Smoothing condensers 42 and 43 are connected across the outputs of these tubes and the D. C. or unidirectional voltage is applied across the integrating network indicated generally at 44 and which includes resistors 45 and 46 and condenser 47. This integrating network functions in the same manner as network 26, above described, and the integration signal voltage components are differentially applied to the grids of the modulating tubes 48 and 49 which supply a control voltage output in the same manner as modulating tubes 31 and 33. Such control voltage outputs are of the frequency of the current source 7 but vary in amplitude in correspondence with variations in average amplitude of the signal voltages derived from the pickup windings 3 and 4 of the flux valve.

In the embodiment of our system shown in Fig. 1 the outputs of the modulating stages are coupled through a transformer 52 with the Y-connected stator windings 50 of repeater 51. As will be observed, the plate potentials are supplied from the source 35 to the plates of respective tubes through various leads which include primary windings on the core of the transformer. For example, the common lead 53 which is connected with plate potential source 35 also connects through lead 54, winding 55 and lead 56 with the plate of tube 31. In conjunction with this transformer primary winding 55, a secondary winding 57 is mounted on the same leg of the transformer core and connects through lead 58 with one of the windings 50a of the stator 50. The secondary winding 57 is also connected through lead 59 with a secondary winding 60 which is connected through lead 61 to a second winding 50b of stator 50. The first and second-mentioned windings 50a and 50b of the stator 50 are connected together and in a Y-connection with the third stator winding 50c. Hence, the resultant of the voltages induced in secondary windings 57 and 60 of coupling transformer 52 is impressed across said two windings 50a and 50b. The primary winding of the transformer which cooperates with secondary winding 60 is indicated at 62 and is connected between the plate of tube 33 and the common lead 53. In other words, the differential voltage output from tubes 31 and 33 is applied through the transformer 52 across windings 50a and 50b of the stator of repeater motor 51. Since the input to the channel of the amplifier including modulating tubes 31 and 33, is derived from the pickup coils 2 and 3 of the flux valve, the voltage across the windings 50a and 50b of the repeater will be dependent upon or will correspond to those voltages derived from the pickup coils 2 and 3 of the flux valve.

Similarly, the plate circuit of the modulating tubes 48 and 49 include primary windings on the core 52a of transformer 52 which are coupled with secondary windings which function through leads 63 and 64 to impress voltages across the windings 50a and 50c of the stator of the repeater which correspond to the signal voltages derived from the pickup coils 3 and 4 of the flux valve.

The repeater rotor winding 65 may be connected directly as shown through leads 66 with the A. C. source 7, because the output control voltages of the amplifier are of the frequency of the current source 7. The rotor of the repeater is adapted to control or rotate a compass card indicated generally at 67 which cooperates with a lubber line 68 to provide azimuthal bearings or directional indications.

In operation, of course, the flux valve of the system shown in Fig. 1, similarly the flux valve of Fig. 2 hereinafter described, is preferably pendulously mounted or otherwise suitably stabilized on a craft so as to be subjected substantially only to the horizontal component of the earth's magnetic field. The repeater or a plurality of such repeaters are located at desired points on the craft, and for all movements of the craft in azimuth the compass card will remain substantially stationary in space, thereby, in cooperation with the lubber line which moves in azimuth with the craft, providing compass bearings or azimuthal indications. Because of the demodulation and modulation steps practiced in the operation of the system shown in Fig. 1 and by virtue of the integration of the azimuthal voltage components, a much improved performance of the repeater is achieved as hereinbefore indicated. Spurious error signals will not cause oscillations of the repeater to any marked extent and accurate and smooth operations of the repeater motor will be provided primarily because of the improved wave form of the control voltages supplied thereto.

In Fig. 2, we have shown a modified form of our invention in which the output of the amplifier is connected to control a direct-current repeater motor which may be of the cross-coil type, as shown. In the embodiment illustrated, the flux valve indicated generally at 70 is arranged to provide two signal voltage outputs. The cruciform core thereof is provided with the usual flux collectors or horns and each arm is provided with a pickup coil as indicated at 70a, 70b, 70c and 70d. The coils 70a and 70b are connected together in series and in aiding relation, and the coils 70c and 70d are similarly interconnected. One end of coils 70b and 70d may be connected together as shown and through lead 71 to a common input terminal 72 of the amplifier, while the opposite ends of coils 70c and 70a are connected through leads 73 and 74, respectively, to input terminals

15 and 76 of the amplifier. The flux valve may be excited substantially in the same manner as shown in Fig. 1, that is, by means of a centrally positioned coil 77 which is connected through leads 78 to a source 79 of alternating or periodically varying current.

As in Fig. 1, one of the input leads to the flux valve 70 preferably includes rectifying means such as a series of oxide rectifiers 74a which serve to supply half wave excitation to the flux valve, and a condenser 74b is likewise preferably provided for the purpose of sustaining the half wave pulses and also for phase adjustment purposes.

The amplifier, in this embodiment of our invention, is designed to provide in the output thereof, integrated voltage components of a D. C. or unidirectional character which are of a polarity depending upon the phase sense of the signal voltage outputs of the flux valve and, in magnitude, are proportional to integrated values of the amplitudes of said signal voltage outputs. To obtain voltage outputs of the foregoing characters, we provide a circuit somewhat similar to that hereinabove described in connection with Fig. 1. That is to say, the signal voltage outputs of coils 70c and 70d are impressed across the input terminals 75 and 72. These terminals are respectively connected with the cathodes of diodes 80 and 81. The plates of these diodes are connected through resistors 82 and 83 with lead 84 which is connected to one side of the current source 79. The other side of said current source is connected through lead 85 and through resistors 86 and 87 to the cathodes of these diodes so that phase-sensitive rectification is produced in a balanced rectifier circuit. Smoothing condensers 88 and 89 are preferably connected across the resistors 82 and 83. The output of these two tubes, which is a unidirectional voltage having a polarity dependent upon the phase sense of the alternating current signals applied across the terminals 72 and 75 and a magnitude proportional to the amplitude of said alternating current signals, is then applied across an integrating network indicated generally at 90.

The integrating network includes the resistors 91 and 92 and the condenser 93. This network at a point between resistance 91 and condenser 93 is connected with the grid of a direct-current amplifier tube 94. Similarly, at a point between the resistance 92 and condenser 93, the network is connected with the grid of a second D. C. amplifier tube 95.

The other channel of the amplifier connecting with the input terminals 72 and 76 is in all material respects similar to that above described. That is, the signal voltages derived from the flux valve pickup coils 70b and 70a are impressed across the input terminals 72 and 76 and across the resistors 96 and 97 and applied to the cathodes of the diode tubes 98 and 99. The plates of these tubes are connected through resistors 100 and 101, with lead 84 which connects with one side of the voltage source 79, while lead 85, which is connected to the other side of said voltage source, connects through the resistors 96 and 97 to the cathodes of these tubes. In this manner, phase-sensitive rectification of the signal voltages takes place in this channel and condensers 102 and 103 function to smooth the voltages before they are applied to the integrating network 104. This network, like the one above described, includes the resistances 105 and 106 and condenser 107, the points intermediate the resistance 105 and condenser 107 and between the resistance 106 and condenser 107 being connected, respectively, with the grids or control electrodes of the D. C. amplifier tubes 108 and 109.

The outputs of the amplifier, that is, the outputs of the D. C. amplifying tubes 94, 95, 108 and 109 are connected with and to control a direct-current motor or repeater. In the embodiment illustrated, this is accomplished by providing field coils arranged with their axes in 90° angular relationship and connecting these coils with the outputs of the amplifier.

The repeater motor of Fig. 2, in the embodiment illustrated, which is indicated generally at 110, comprises a stator 111 having field windings 111a and 111b arranged in coaxial relation and also coils 111c and 111d which likewise are arranged in coaxial relation. The axes of these coils lie at 90° to each other. The plate of tube 94 is connected to one end of coil 111a, while the plate of tube 95 is connected to one end of coil 111b, the other ends of these coils being connected together. Similarly, one end of coil 111d is connected with the plate of tube 108 and one end of coil 111c is connected with the plate of tube 109, and the other ends of these coils are connected together and to the mid point between the coils 111a and 111b. The plate circuits of these tubes may be completed by means of lead 112 which connects between the point 113 of common connection between all of the windings of the repeater and with the positive terminal of battery 114, the negative terminal of which is connected through lead 115 with the cathodes of tubes 94 and 95 and through lead 116 with the cathodes of tubes 108 and 109.

The rotor of the repeater motor 110 preferably comprises a permanent magnet 117 which is adapted to rotate throughout 360° relative to the stator or field windings of the motor, above described, and which is positioned in accordance with the relative values of the voltages applied to the stator field windings. The permanent magnet rotor is connected as schematically indicated in Fig. 2 to operate the compass card 118 which cooperates with a fixed lubber line 119, the repeater motor therefore functioning, in the system of Fig. 2, to provide compass indications under the control of the flux valve 70.

The operation of the system described in Fig. 2 is substantially as follows. The flux valve 70 serves to provide a pair of signal voltage outputs which are measures of the magnitudes of two components of the earth's magnetic field at right angles to each other and measured along the longitudinal axes of the arms of the cruciform core of the flux valve. These signal voltages are supplied to the amplifier which operates as a phase-sensitive, balanced rectifier or amplifier to first demodulate or rectify these alternating voltage signals to produce corresponding unidirectional voltages having a polarity and magnitude dependent upon the phase sense and amplitude of the alternating signal voltages. These unidirectional voltages are integrated and the integration components are then suitably amplified and applied to the field windings of the D. C. motor, which windings are arranged in space quadrature. Respective windings of the repeater motor are supplied with those amplified unidirectional voltages which correspond to the alternating voltage outputs of the similarly positioned pickup coils of the flux valve.

It should be noted in connection with the system of Fig. 2 that a smoothing action is obtained thereby so that the repeater motor is smoothly positioned during turning movements of the craft carrying the compass system in azimuth. Furthermore, spurious errors in the output of the flux valve of relatively short duration not exceeding the time constant of the integrating network are smoothed out and do not influence the repeater motor at least to the extent causing it to be "jittery." It may be additionally noted that a high torque output may be developed by the repeater motor.

In Fig. 3, we have shown a further modification of our invention and have therein represented but one channel of this form of amplifier. The purpose of the amplifier of Fig. 3 is to still further smooth out the signal or control voltages whereby to further improve the operating characteristics of a repeater connected therewith. In order to accomplish this, we propose to employ a feedback loop including a modulating stage which provides a feedback voltage at the frequency of the local source employed in connection with the amplifier but which feedback voltage varies in amplitude in accordance with the variations in magnitude of the voltage which is proportional to rate of change of amplitude of the signal voltage in the system. In other words, the amplifier of Fig. 3 is designed to prevent high frequency voltage fluctuations which may be due to changes in voltage supply, as for example, when used on aircraft and the like where such voltage fluctuations are present, from appearing in the output of the amplifier and deleteriously effecting the operation of the repeater.

Referring to Fig. 3 in which a signal voltage such as that derived from any one or more of the pickup coils of a flux valve may be impressed across the input terminals 120 and 121 of the amplifier, 122 indicates generally a demodulator stage which may be of the character of those illustrated in Figs. 1 and 2. The output of this stage is applied to an integrating network 123 which likewise may be similar to the integrating networks shown in both Figs. 1 and 2. The unidirectional integration voltage components appearing in the output of the integrating network 123 are, in the embodiment illustrated, applied to the input of a modulator stage indicated generally at 124. The voltage outputs of this modulator stage comprise voltage components of a frequency of that of voltage source 125 which vary in amplitude in accordance with changes in magnitude of the integration voltage components and, therefore in accordance with the variations in amplitude of the signal voltage derived from the flux valve. In the embodiment shown in Fig. 3, the output of modulator 124 is applied to an indicator 126 which may be of any type such as hereinbefore described in connection with Figs. 1 and 2, and the amplifier of Fig. 3 will, of course, in this latter event, be illustrative of one of the channels of the complete amplifier. In the event the flux valve is a single legged valve having a single elongated core and a servo system is substituted for the indicator 126, which functions to maintain the flux valve oriented in space and in a position providing zero voltage output, then but a single channel amplifier such as that shown in Fig. 3 is necessary.

In order to prevent spurious voltage changes, such as those appearing in the voltage across the power source, from appearing in the output of modulator 124, we provide a feedback loop which includes the leads 127 connected across the output of the integrating network and a rate-taking network indicated generally at 128 which is connected thereacross. This network includes a resistor 129 across leads 127 and a condenser 130 in series with one of the leads. Since the output of the integrating network is a unidirectional voltage, any voltage appearing across resistor 129 will be a voltage drop caused by current flow therethrough resulting from a change in voltage across the leads 127 charging or discharging condenser 130. When the unidirectional voltage output from the integrator is a constant, no current will flow in network 128 and therefore no voltage will appear across resistor 129. The voltage across resistor 129 which is proportional to rate of change of voltage ouput of the integrating system is applied through leads 131 to modulator 132 which supplies across its output leads 133 an alternating voltage, alternating at the frequency of the source 125 and dependent in magnitude upon the unidirectional voltage which is proportional to rate of change in magnitude of the output of the integrating network. The modulation components derived from modulator 132 are fed back to the input to the demodulator 122 in such phase sense as to oppose rapid changes in the signal voltages which are of a frequency order greater than the frequency of the signal voltage components applied to the amplifier or of the frequency of the alternating current source 125. In accordance with the present invention, the signal voltages applied across the input terminals 120 and 121, will be of the frequency of said source 125.

The operation of the amplifier of Fig. 3 is substantially the same as the amplifier shown in Fig. 1 with the additional smoothing or filtering action derived from the feedback loop. For example, sudden fluctuations in the voltage derived from the voltage source 125 which provide spurious errors in the amplifier will appear as rapid changes in the unidirectional voltage output of the integrating network. A voltage proportional to such rate of change is modulated with voltage components from the voltage source and is supplied together with the signal voltage but in a degenerative sense to the input of the demodulator, whereby to oppose such rapid changes and thereby smooth out the signal voltage or output voltage components. The effect of the feedback loop is to reduce the gain of the amplifier to transient hash of the frequencies that would cause the indicator to jitter. This also can be looked upon as further integration but for a different purpose. As hereinbefore indicated, the combination and arrangement of elements shown in Fig. 3 may be embodied in a two-channel amplifier of the character shown in Figs. 1 and 2.

In the foregoing, we have, for exemplary purposes, indicated and described the use of a half-wave rectifier as a means of exciting the flux valve with current of a frequency substantially one-half that of the source 7, 79 or 125 as the case may be. It will, of course, be understood that we may and preferably do employ a frequency fractionating circuit such as an oscillator or any other conventional frequency generator which is keyed to the source, such as source 7, so that the phase relation of its output, which is used to excite the flux valve, is substantially fixed with respect to that of source 7 but the frequency of its output is one-half that of source 7. In this latter arrangement, the input to the flux valve is full wave at one-half the frequency of the source thereby providing a flux valve output of desired frequency and relatively good wave form for phase sensitive demodulation of the frequency of the source.

While we have described the system of our invention as embodying multi-legged flux valves, it will, of course, be understood that a flux valve having a single leg or a linearly extending core may be employed, and, in this event, a motor is arranged to orient the flux valve in the external magnetic field and to maintain it at a position of zero signal voltage output under the control of the outputs of the valve.

Furthermore, while we have described our invention in its preferred embodiments it is to be understood that the words which we have used are words of description rather than of limitation and that changes within the purview of the appended claims may be made without departing from the true scope and spirit of our invention in its broader aspects.

What is claimed is:

1. A system of the character described comprising means connected in multicircuit fashion for supplying a plurality of periodically varying signal voltage outputs each dependent in phase and magnitude upon the position of said means in an external magnetic field, an amplifier connected to receive said signal voltages and comprising phase-sensitive means for rectifying said signal voltage outputs and means for integrating the unidirectional voltage components, and a synchronous motor having field windings connected in multicircuit fashion corresponding to the interconnection of said first mentioned means and to the output of said amplifier whereby the signal voltage outputs of said first mentioned means control the energization of corresponding motor field windings.

2. A flux valve system of the character described, comprising a flux valve having signal voltage-supplying means connected in multicircuit fashion for supplying a plurality of periodically varying signal voltage outputs, means for exciting said flux valve, an amplifier connected to receive said signal voltages and comprising phase-sensitive means for demodulating said signal voltages and means for integrating the demodulation components, and a synchronous motor having field windings connected in multicraft fashion corresponding to the interconnection of said first mentioned means and to the output of said amplifier whereby the signal voltage outputs of said first mentioned means control the energization of corresponding motor field windings.

3. A system of the character described comprising means connected in multicircuit fashion for supplying a plurality of periodically varying signal voltage outputs each dependent in phase sense and magnitude upon the position of said means in an external magnetic field, a source of periodically varying voltage connected with said means for rendering the same field-sensitive, an amplifier connected to receive said signal voltages and comprising phase-sensitive means for demodulating the signal voltage outputs from said first-mentioned means, means for integrating the demodulation components and means for modulating the integration voltage components with voltage components from said voltage source, and a synchronous motor having field windings connected in multicircuit fashion corresponding to the interconnection of said first mentioned means and to the output of said amplifier whereby the signal voltage outputs of said first mentioned means control the energization of corresponding motor field windings, and the rotor winding of said motor being energized from said voltage source.

4. A flux valve system of the character described comprising a flux valve having voltage-supplying means connected in multicircuit fashion for supplying a plurality of periodically varying signal voltage outputs, a source of periodically varying voltage connected with said flux valve for exciting the same, an amplifier connected to receive said signal voltages and comprising phase-sensitive means for demodulating said signal voltage outputs, means for integrating the demodulation components and means for modulating the integration voltage components with voltage components from said voltage source, and a synchronous motor having field windings connected in multicircuit fashion corresponding to the interconnection of said first mentioned means and to the output of said amplifier whereby the signal voltage outputs of said first mentioned means control the energization of corresponding motor field windings, and the rotor winding of said motor being energized from said voltage source.

5. A flux valve system of the character set forth in claim 4, in which the integrating means comprises a resistance-capacitance network.

6. A system of the character described comprising means connected in multicircuit fashion for supplying a plurality of periodically varying signal voltage outputs dependent in phase and magnitude upon the position of said means in an external magnetic field, an amplifier connected to receive said signal voltages and comprising phase-sensitive means for rectifying said signal voltage outputs to provide unidirectional voltages corresponding in polarity sense and magnitude to the phase sense and amplitude of said signal voltage outputs and means for integrating said unidirectional voltages, and a synchronous motor having field windings connected in multicircuit fashion corresponding to the interconnection of said first mentioned means and to the output of said amplifier whereby the signal voltage outputs of said first mentioned means control the energization of corresponding motor field windings.

7. A flux valve compass system of the character described comprising a flux valve having voltage-supplying means connected in multicircuit fashion for supplying a plurality of alternating signal voltage outputs, a source of alternating current connected with said flux valve for exciting the same, a synchronous motor having its rotor connected with said source, and an amplifier connected to receive said signal voltages and comprising a pair of diodes arranged in a balanced phase-sensitive rectifier circuit, said circuit being connected to said alternating current source whereby to render it phase sensitive, and a resistance-capacitance integrating network connected to the output of said diodes, said motor having field windings connected in multicircuit fashion corresponding to the interconnection of said first mentioned means and to the output of said amplifier in a manner such that the signal voltage outputs of said first mentioned means control the energization of corresponding motor field windings.

8. A flux valve compass system of the character described comprising a flux valve having voltage-supplying means connected in multicircuit fashion for supplying a plurality of alternating signal voltage outputs, a source of alternating current connected with said flux valve for exciting the same, a synchronous motor having its rotor winding connected with said source, and an amplifier connected to receive said signal voltages and comprising a pair of diodes arranged in a balanced phase-sensitive rectifier circuit, said circuit being connected to said alternating current source whereby to render it phase sensitive, a resistance-capacitance integrating network connected to the output of said diodes, and means for modulating the integration voltage components with voltage components from said source of alternating current, said motor having field windings connected in multicircuit fashion corresponding to the interconnection of said first mentioned means and to the output of said amplifier in a manner such that the signal voltage outputs of said first mentioned means control the energization of corresponding motor field windings.

9. A flux valve compass system comprising a multi-legged flux valve, each leg comprising an output coil and said coils being connected together in multicircuit fashion to provide a plurality of signal voltages, means including a source of alternating current for exciting said flux valve, an amplifier connected to receive said signal voltages and comprising phase-sensitive means for demodulating the signal voltage outputs derived from said flux valve and means for integrating the demodulation components, and a D. C. synchronous motor having field windings connected together in multicircuit fashion corresponding to the interconnection of the coils of said flux valve and connected for energization by the respective integration voltage components, said motor having its stator coils arranged in number and relative angular relationship to correspond to the number and arrangement of the legs of said flux valve.

10. A flux valve system of the character described comprising a flux valve for supplying periodically varying signal voltage outputs, a source of periodically varying voltage connected with said flux valve for exciting the same, means for demodulating said signal voltage outputs, means for integrating the demodulation components, motor means connected for control by the integration voltage components, and a feedback loop including means for producing a rate voltage proportional to rate of change of said integration voltage components and modulator means having said rate voltage fed thereto, said loop being connected degeneratively to introduce the voltage output of the modulator means therein to said demodulating means whereby to render the motor-control voltage components substantially free from fluctuations due to fluctuations in voltage at the source.

11. A system comprising transmitter means for supplying periodically varying signal voltage outputs, phase-sensitive means for demodulating said signal voltages to provide unidirectional voltages corresponding in polarity sense and magnitude to the phase sense and amplitude of said signal voltages, means for integrating said unidirectional voltages, motor means connected for control by the integration voltage components, and a feedback loop including means for producing a rate voltage proportional to rate of change of said integration voltage components and modulator means having said rate voltage fed thereto, said loop being connected degeneratively to introduce the voltage output of the modulator means therein to said demodulating means whereby to render the motor-control voltage components substantially free from fluctuations due to fluctuations in voltage at the source.

12. A flux valve system of the character described comprising a flux valve for supplying periodically varying signal voltage outputs, a source of periodically varying voltage connected with said flux valve for exciting the same, means for demodulating said signal voltage outputs, means for integrating the demodulation components, means for modulating the integration voltage components with voltage components from said source, motor means connected for energization by the modulation voltage components and also with said source, and a feedback loop including means for producing a rate voltage proportional to rate of change of said integration voltage components and modulator means having said rate voltage fed thereto, said loop being connected degeneratively to introduce the voltage output of the modulator means therein to said demodulating means whereby to render the motor-control voltage components substantially free from fluctuations due to fluctuations in voltage at the source.

REGINALD V. CRADDOCK.
ROBERT S. CURRY, Jr.

REFERENCES CITED

The following references are of record in the file of this patent:

UNITED STATES PATENTS

| Number | Name | Date |
|---|---|---|
| 2,352,953 | Haight | July 4, 1944 |
| 2,361,433 | Stuart | Oct. 31, 1944 |
| 2,363,342 | Lesnick | Nov. 21, 1944 |